US009842116B2

(12) United States Patent
Pimprikar et al.

(10) Patent No.: US 9,842,116 B2
(45) Date of Patent: Dec. 12, 2017

(54) METHOD AND SYSTEM FOR SYNCHRONIZING DATA BETWEEN A DATABASE SYSTEM AND ITS CLIENT APPLICATIONS

(71) Applicant: Veeva Systems Inc., Pleasanton, CA (US)

(72) Inventors: Abhay Pimprikar, Campbell, CA (US); David Wright, Dublin, CA (US); Jay Hartley, Dublin, CA (US); Cindy Chiang, Sunnyvale, CA (US); Uri Reich, Menlo Park, CA (US)

(73) Assignee: Veeva Systems Inc., Pleasanton, CA (US)

( * ) Notice: Subject to any disclaimer, the term of this patent is extended or adjusted under 35 U.S.C. 154(b) by 296 days.

(21) Appl. No.: 14/318,281

(22) Filed: Jun. 27, 2014

(65) Prior Publication Data

US 2015/0379037 A1 Dec. 31, 2015

(51) Int. Cl.
*G06F 7/00* (2006.01)
*G06F 17/00* (2006.01)
*G06F 17/30* (2006.01)
*H04L 29/06* (2006.01)
*H04L 29/08* (2006.01)

(52) U.S. Cl.
CPC .... *G06F 17/30174* (2013.01); *H04L 67/1095* (2013.01); *H04L 67/42* (2013.01)

(58) Field of Classification Search
CPC ............... G06F 17/30; G06F 17/30174; G06F 17/30008; H04L 67/42; H04L 67/1095; H04L 29/06
See application file for complete search history.

(56) References Cited

U.S. PATENT DOCUMENTS

| 7,428,544 | B1* | 9/2008 | Natarajan | G06Q 10/107 |
| 2004/0030852 | A1* | 2/2004 | Coombs | G06F 11/1448 711/162 |
| 2011/0072092 | A1* | 3/2011 | Zedlitz | G06F 17/3056 709/206 |
| 2012/0066025 | A1* | 3/2012 | Quinn | G06Q 10/0637 705/7.31 |
| 2012/0231441 | A1* | 9/2012 | Parthasarathy | G09B 7/02 434/362 |
| 2014/0223423 | A1* | 8/2014 | Alsina | G06F 8/65 717/173 |
| 2015/0134746 | A1* | 5/2015 | Offenhartz | H04L 67/306 709/205 |

* cited by examiner

*Primary Examiner* — Azam Cheema

(57) ABSTRACT

Systems and methods for synchronizing data between a database system and its client applications are provided. After a regular synchronization, objects' records on a user computing device may be checked against a new sharing rule. Newly shared records may be synced down to the user computing device regardless of timestamps, and all records which the user no longer has access to may be removed from the user computing device. Consequently, data on the user computing device complies with the new sharing rule.

18 Claims, 18 Drawing Sheets

600C

```
┌─────────────────────────────────────────────────┐
│  ⌂            CRM              🔍               │
├──────────────┬──────────────────────────────────┤
│ Account Type │ My Accounts                    + │
│              │                                  │
│ Business     │ Add a new account:               │
│ Accounts     │ Name    [Jane Doe          ]──621│
│              │                                  │
│ Account Lists│ Address [345 Main Street,  ]──622│
│ + New List   │         [Springfield,USA   ]     │
│              │         [12345             ]     │
│              │ Phone # [(555)             ]──623│
│              │ Territory [                ]──624│
│              │ License # [                ]──625│
│              │ License                          │
│              │ exp. Date [                ]──626│
└──────────────┴──────────────────────────────────┘
```

FIG. 6C

| Action | | Object Configuration Name | Active | Type | Object Name |
|---|---|---|---|---|---|
| ☐ Edit | Del | TSM-0000001 | v | Full Sync | Attendee_vod_c |
| ☐ Edit | Del | TSM-0000002 | v | Full sync | Product_vod_c |

FIG. 7A

| Action | | Object Configuration Name | Active | Type | Object Name |
|---|---|---|---|---|---|
| ☐ Edit | Del | TSM-0000004 | v | Top Level | Account |
| ☐ Edit | Del | TSM-0000005 | v | Top Level | User |

FIG. 7B

| Action | Object Configuration Name | Active | Type | Object Name |
|---|---|---|---|---|
| ☐ Edit  Del | TSM-0000007 | v | Related To Top Level | Task |

FIG. 7C

| KM | Product | Users |
|---|---|---|
| KM1 | C | Group 1 (user 1 and 4) |
| KM2 | L | Group 2 (user 2 and 3) |
| KM3 | C | Group 1 (user 1 and 4) |
| KM4 | L | Group 2 (user 2 and 3) |

FIG. 8A

| KM | Product | Users |
|---|---|---|
| KM1 | C | Group 1 (user 1) |
| KM2 | L | Group 2 (user 2, 3 and 4) |
| KM3 | C | Group 1 (user 1) |
| KM4 | L | Group 2 (user 2, 3 and 4) |

FIG. 8B

METHOD AND SYSTEM FOR SYNCHRONIZING DATA BETWEEN A DATABASE SYSTEM AND ITS CLIENT APPLICATIONS

BACKGROUND

The subject technology relates generally to data synchronization, and more particularly to data synchronization between a database system and its occasionally connected client applications.

Database systems are widely used to hold data and provide support to various operations in business environments such as management of organizations, and interactions with customers and suppliers. User computing devices, including laptop computers, desktop computers, mobile phones, smart phones, tablet computers and personal digital assistants (PDAs), may connect to database systems via a network, and client applications on user computing devices may communicate data with database systems, or server systems. Data communications between client applications and database systems typically include retrieving data, updating data, and deleting data.

Oftentimes, a client database may be maintained on a user computing device to support operation of a client application, especially when the user computing device is offline, and synchronized with the database system regularly, when the user computing device joins the network again, and/or when the user requests for synchronization. The client database may store a subset of data from the database system which may be needed to support the client application's operation, and is especially important for mobile computing devices whose connections with the database system are potentially intermittent or unreliable.

FIG. 1 illustrates a prior art synchronization process. As shown, the synchronization may start at 101. At 102, it is determined if a user is logged into a client application and if his/her computing device is authenticated. If not, the process may return to 101. Otherwise, at 103, it is determined if it is time for synchronization. And if yes, the synchronization may be performed at 104 and the process may then return to 101.

Since users want ubiquitous access to applications and data, and want the data to be as correct and up to date as possible, it is desirable to provide a method and system which can quickly synchronize data between a database system and its client applications without overburdening user computing devices.

SUMMARY

The disclosed subject matter relates to a machine-implemented method for synchronizing data between a database system and its clients. The method includes: determining if enhanced synchronization is enabled for a first object, wherein the first object was downloaded to the client database according to a first protocol for accessing the database system; when the enhanced synchronization is enabled for the first object, performing a regular synchronization for updating the first object in the client database; and performing the enhanced synchronization according to a second protocol for accessing the database system. The enhanced synchronization comprises: determining ID of the first object; and querying the database system for ID of at least one object which should be downloaded to the client database according to the second protocol for accessing the database.

BRIEF DESCRIPTION OF THE DRAWINGS

FIGS. 6A, 6B, 6C and 6D illustrate screenshots during an exemplary synchronization.

FIG. 7A illustrates some examples of objects which may use a full object synchronization.

FIG. 7B illustrates some examples of objects which may use a top level object synchronization.

FIG. 7C illustrates some examples of objects which may use a related-to-top level synchronization.

FIGS. 8A and 8B illustrate a sharing rule change scenario where data synchronization of the present invention may be used.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The subject technology is directed to techniques for synchronizing data between database systems and client applications. After a regular synchronization, objects' records on a user computing device may be checked against sharing rules. Newly shared records may be synced down to the user computing device regardless of timestamps, and all records which the user no longer has access to may be removed from the user computing device. Consequently, data on the user computing device complies with the sharing rules.

Figure 1:
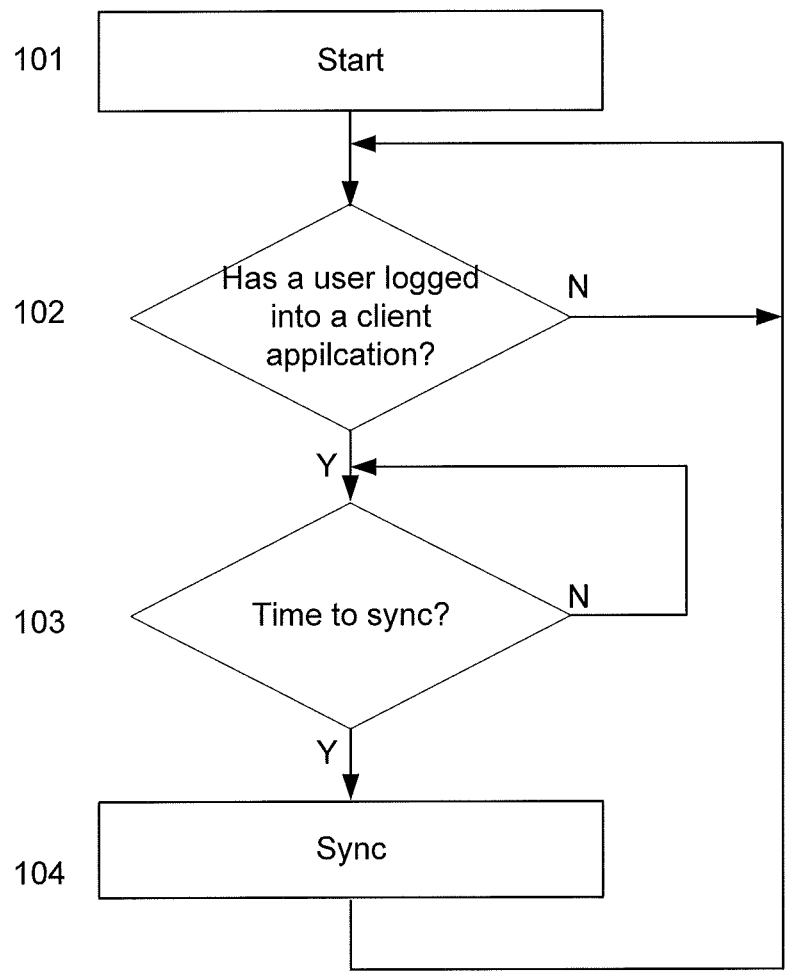
FIG. 1 illustrates a prior art synchronization process.
Figure 2A:
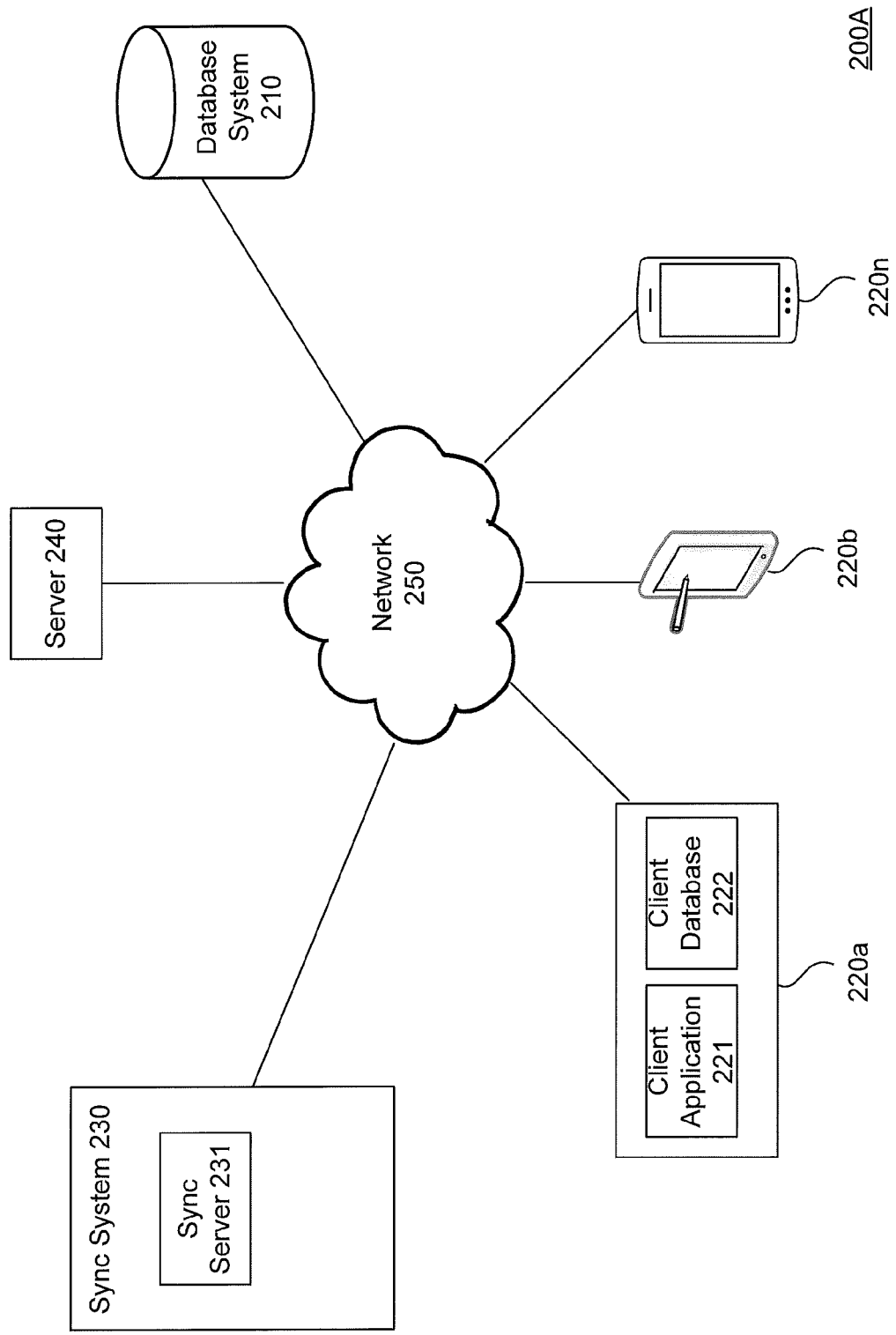
FIGS. 2A, 2B and 2C illustrate exemplary high level block diagrams of environments wherein a database service may be used and data synchronization of the present invention may be implemented.

FIG. 2A illustrates an exemplary high level block diagram of an environment 200A wherein a database service may be used and data synchronization of the present invention may be implemented. As shown, the environment 200A may include a database system 210, a plurality of user computing devices 220a, 220b, . . . 220n, a sync system 230, and a server 240, coupled to each other via a network 250. The network 250 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 220a-220n may be any machine or system that is used by a user to access the database system 210 via the network 250, and may be any commercially available computing devices including laptop computers, desktop computers, mobile phones, smart phones, tablet computers, netbooks, and personal digital assistants (PDAs). A client application 221 may run from a user computing device, e.g., 220a, and access data in the database system 210 via the sync system 230 and the network 250. A client database 222 for the client application 221 may store a subset of data from the database system 210 which may be needed to support the operation of the client application 221. The client database 222 may be synchronized with the database system 210 regularly, when the user computing device is back online, and/or when the user requests for synchronization. User computing devices 220a-220n are illustrated in more detail in FIG. 4.

The server 240 is typically a remote computer system accessible over a remote or local network, such as the network 250. The server 240 could be any commercially available computing devices. A client application (e.g., 221) process may be active on one or more user computing devices 220a-220n, and the corresponding server process may be active on the server 240. The client application process and the corresponding server process may communicate with each other and with the sync system 230 and the database system 210 over the network 250, thus providing distributed functionality and allowing multiple client applications to take advantage of the information-gathering capabilities of the database system 210.

The database system 210 may store data that client applications (e.g., 221) in user computing devices 220a-220n may use. In one embodiment, the database system 210 may store data that pharmaceutical companies may need when promoting new products, which may include physician information (e.g., name, specialty, license information, affiliated health care organization ("HCO"), contact information at the affiliated HCO, prior interaction record, electronic signature for samples, and medical inquiry submission), product information (e.g., name, category, lot and statistics), sales representative information (e.g., name, territory information, sharing rules and sales reports). It should be understood that the database system 210 may store data for other industries.

In one embodiment, the database system 210 may be a customer relationship management ("CRM") database for managing opportunities and tracking employee success rates.

In one embodiment, the database system 210 may be a multi-tenant database system where various elements of hardware and software of the database system 210 may be shared by one or more customers. For instance, a server may simultaneously process requests from a plurality of customers, and a database table may store rows for a plurality of customers. In a multi-tenant database system, a user is typically associated with a particular customer. In one example, a user could be a sales representative of one of a number of pharmaceutical companies which are tenants, or customers, of the database system 210.

In one embodiment, the database system 210 may be a cloud database which runs on a cloud computing platform. Users can run databases on the cloud independently by using a virtual machine image, or purchasing access to a database service maintained by a cloud database provider.

The sync system 230 may include a sync server 231 for facilitating data transfer and data synchronization between user computing devices 220a-220n and the database system 210. Specifically, the sync server 231 may receive data from user computing devices 220a-220n, and forward the received data to the database system 210. It may query the database system 210 in response to requests from user computing devices 220a-220n, receive corresponding data from the database system 210, and then transmit the corresponding data to user computing devices 220a-220n. In addition, the sync server 231 may receive sync requests from user computing devices 220a-220n including both regular automatic sync requests and users' manual sync requests, obtain data from the database system 210 according to data sync rules set forth in advance, and return the obtained data to the user computing devices 220a-220n. The sync server 231 may use any commercially available computing devices. The sync system 230 is illustrated in more detail in FIG. 5.

Although the server 240 and the sync server 231 are shown in FIG. 2A as two separate servers, they can be implemented by one computing device.

Figure 2B:
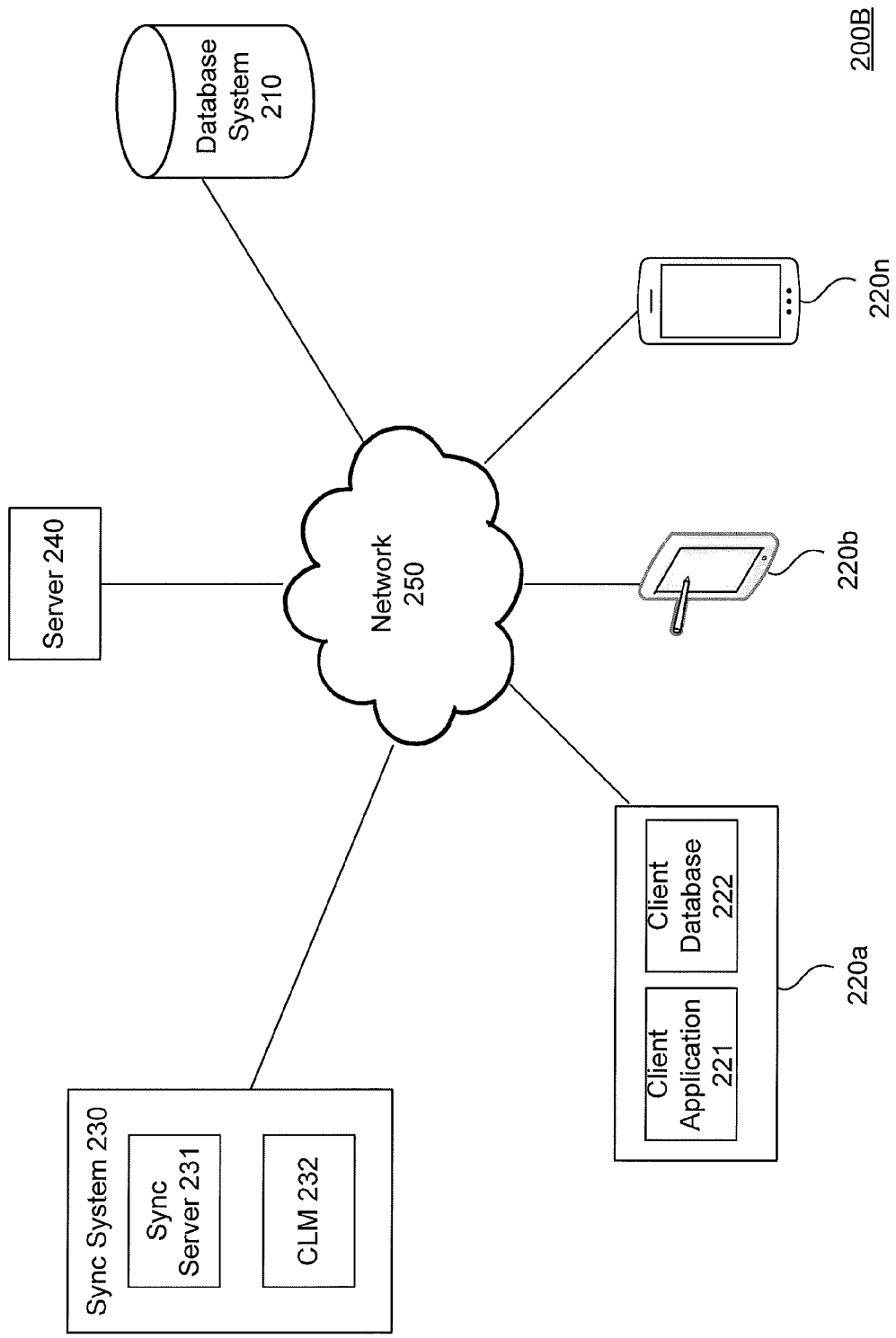

FIG. 2B illustrates an exemplary high level block diagram of an environment 200B wherein a database service may be used and data synchronization of the present invention may be implemented. Like the environment 200A shown in FIG. 2A, the environment 200B may include the database system 210, the plurality of user computing devices 220a, 220b, . . . 220n, the sync system 230, and the server 240, coupled to each other via the network 250. In addition to the sync server 231, the sync system 230 may further include a closed loop marketing ("CLM") module 232, which has CLM content downloadable to user computing devices 220a-220n. In one embodiment, the CLM content may include rich media that sales representatives of a pharmaceutical company may use when they engage physicians. The CLM content may be displayed from the same client application (e.g., 221) that the sales representatives use to record calls with the physicians, and showcase important information that the sales representatives want to convey to the physicians (i.e., their targets). The CLM content may be continuously improved for maximum effectiveness. In one implementation, each piece of the CLM content is associated to a Key Message record, and is uploaded in industry standard formats and can include images, pdfs, videos, and HTML presentations. The CLM content may be downloaded to user computing devices 220a-220n during synchronization according to the present invention, ensuring that users have access to the most current and relevant information on their computing devices. In one implementation, the CLM module 232 may be integrated with the accounts and schedules of the sales representatives. In one embodiment, as the CLM content is viewed, Key Message information, duration of viewing, and additional customer defined clickstreams may be tracked to provide valuable statistics so the sales representatives may gain insight into their targets.

Figure 2C:
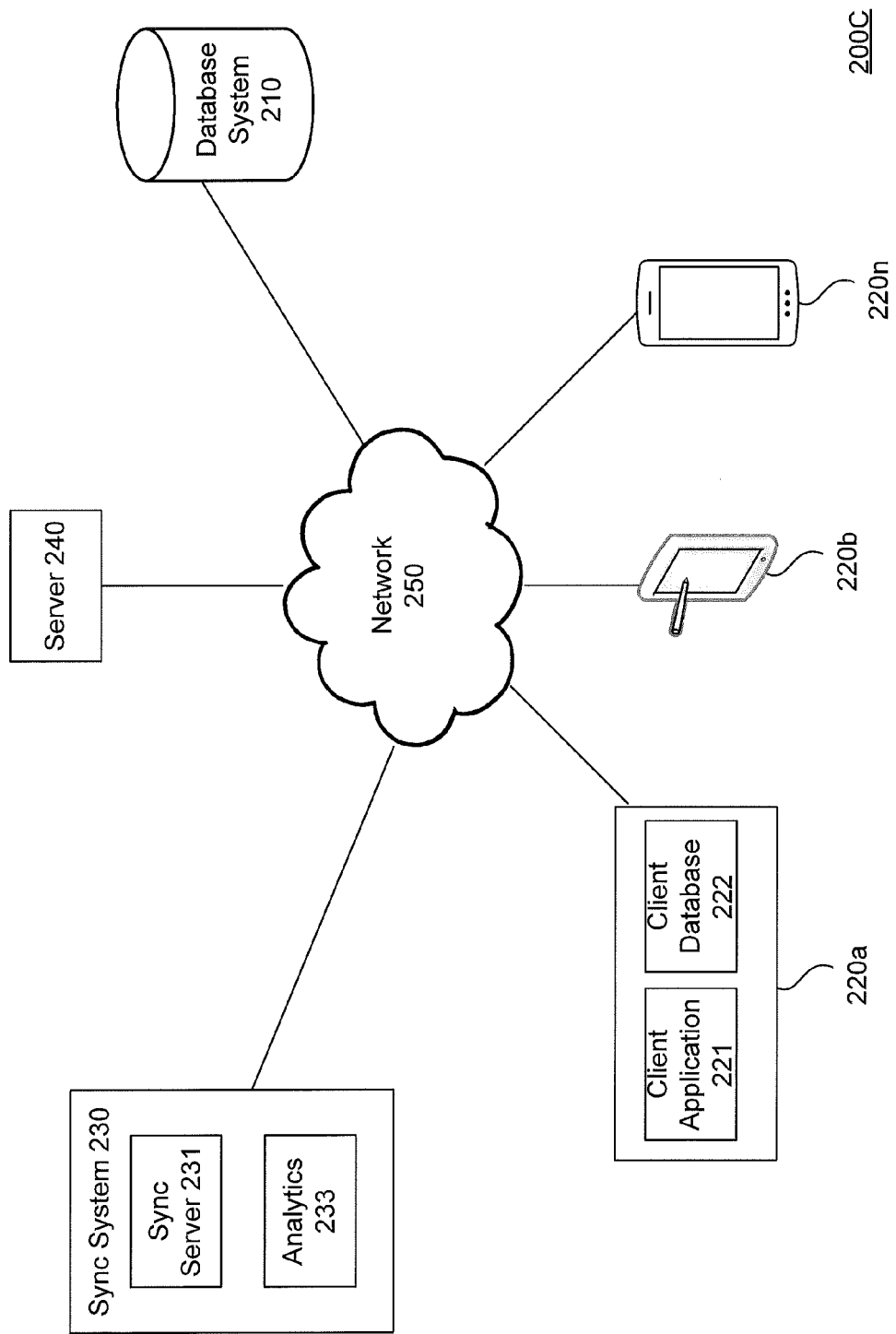

FIG. 2C illustrates an exemplary high level block diagram of an environment 200C wherein a database service may be used and data synchronization of the present invention may be implemented. Like the environment 200A shown in FIG. 2A, the environment 200C may include the database system 210, the plurality of user computing devices 220a, 220b, . . . 220n, the sync system 230, and the server 240, coupled to each other via the network 250. In addition to the sync server 231, the sync system 230 may further include an analytics module 233 for providing analytics data which may be downloaded to user computing devices 220a-220n. The analytics module 233 may include programming that analyzes data about opportunities or targets and presents it so that better and quicker business decisions can be made. The analytics module 233 may be a form of online analytical processing (OLAP) and may employ data mining, which may turn data collected about opportunities and/or targets into useful information. Such information may include, e.g., target segmentation groupings (for example, dividing targets into those most and least likely to be interested in a product); profitability analysis; personalization (the ability to market to targets based on the data collected about them); and event monitoring. Data collection and analysis by the analytics module 233 may be a continuing and iterative process, and user decisions may be refined based on feedback from earlier analysis and consequent decisions.

In a further embodiment, the sync system 230 may include the sync server 231, the CLM module 232, and the analytics module 233.

Figure 3:
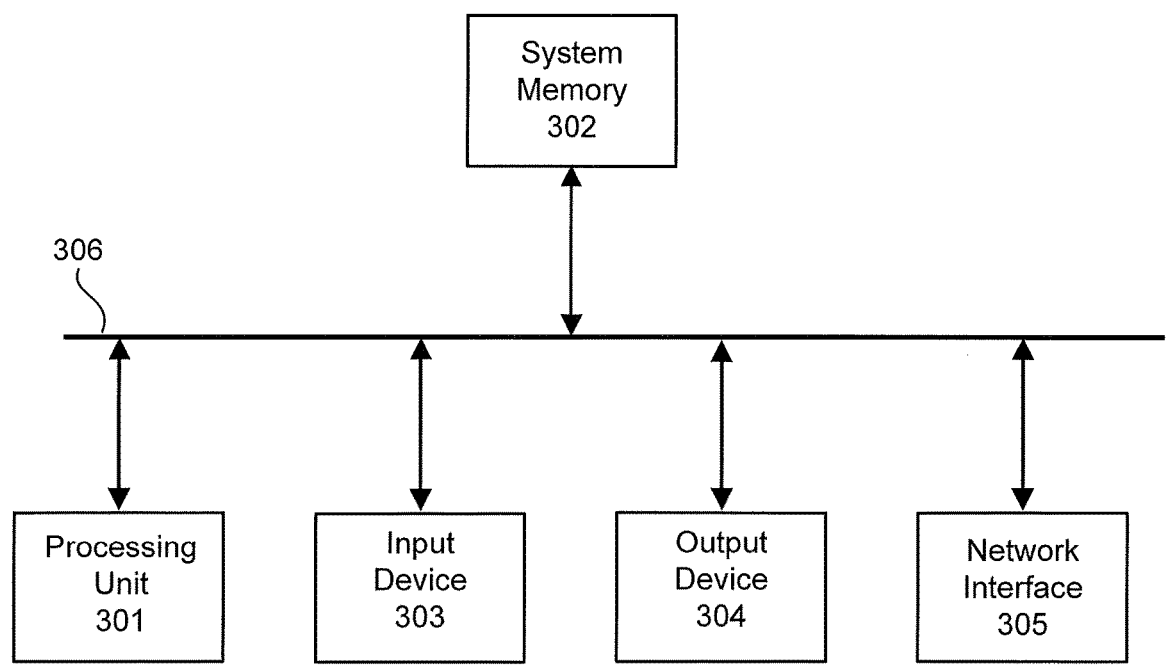
FIG. 3 illustrates an exemplary block diagram of a computing device.

FIG. 3 illustrates an exemplary block diagram of a computing device 300 which can be used as the user computing devices 220a-220n, the sync server 230 and/or the server 240 in FIGS. 2A-2C. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 250) and/or buses. The network interface 305 may be configured to allow the computing device 300 to transmit and receive data in a network, for example, the network 250. The network interface 305 may include one or more network interface cards (NICs).

Figure 4:
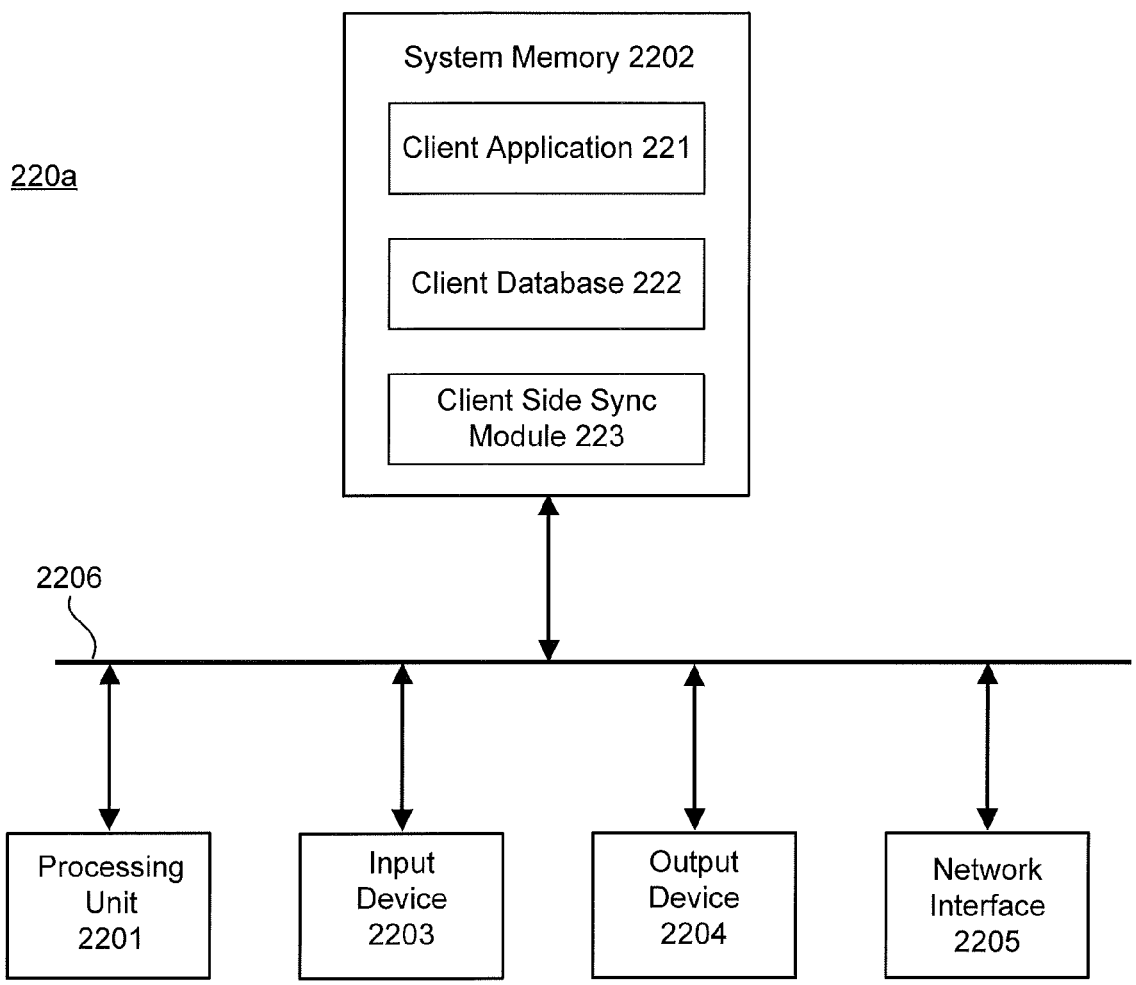
FIG. 4 illustrates an exemplary high level block diagram of a user computing device wherein data synchronization of the present invention may be implemented.

FIG. 4 illustrates an exemplary high level block diagram of a user computing device (e.g., 220a) wherein data synchronization of the present invention may be implemented. The user computing device 220a may be implemented by the computing device 300 described above, and may have a processing unit 2201, a system memory 2202, an input device 2203, an output device 2204, and a network interface 2205, coupled to each other via a system bus 2206. The client application 221 and the client database 222 may be stored in the system memory 2202. In one embodiment, the client database 222 may be maintained in a local store, e.g., a hard disk, relational store, cache memory, etc. The system memory 2202 may also store a client side sync module 223, which may coordinate with a server side sync module 2317 (shown in FIG. 5) in the sync server 231 to facilitate data synchronization between the client database 222, the sync system 230 and the database system 210. The data synchronization will be described in more detail in FIGS. 9A and 9B.

In one implementation, the client database 222 may store a subset of data from the database system 210 which may be needed to support the operation of the client application 221. In one implementation, the client database 222 may also store CLM content downloaded from the CLM module 232 in the sync system 230 (shown in FIG. 2B) and synchronize with the CLM module 232. In one embodiment, the client database 222 may further store analytics data downloaded from and synchronized with the analytics module 233 in the sync system 230 (shown in FIG. 2C). The data in the client database 222 may be associated with a specific user, and only data that the user is allowed to use when running the client application 221 on his/her user computing device 220a may be downloaded to the user computing device 220a during synchronization with the sync system 230.

Figure 5:
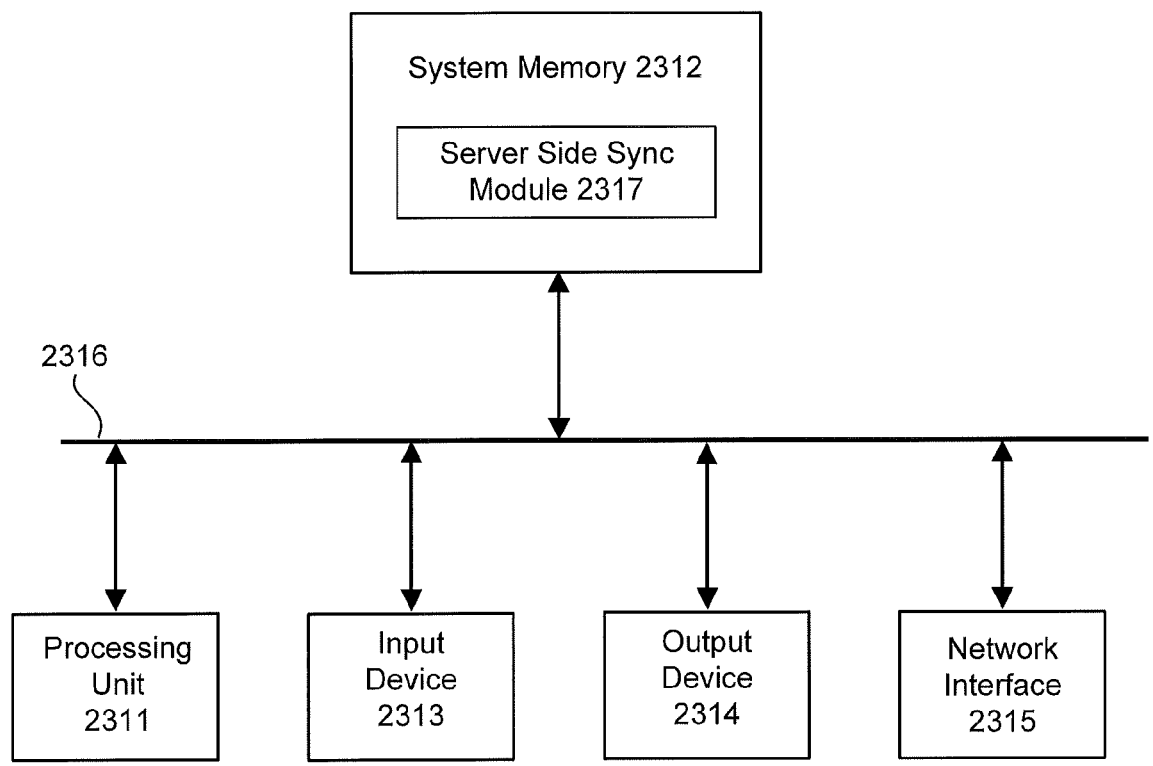
FIG. 5 illustrates an exemplary high level block diagram of a sync server wherein data synchronization of the present invention may be implemented.

FIG. 5 illustrates an exemplary high level block diagram of the sync server 231 wherein data synchronization of the present invention may be implemented. The sync server 231 in the sync system 230 may be implemented by the computing device 300, and may have a processing unit 2311, a system memory 2312, an input device 2313, an output device 2314, and a network interface 2315, coupled to each other via a system bus 2316. The system memory 2312 may store a server side sync module 2317, which may coordinate with the client side sync module 223 (shown in FIG. 4) in the user computing device 220a to facilitate data synchronization between the client database 222, the sync system 230 and the database system 210. The data synchronization will be described in more detail in FIGS. 9A and 9B.

In one embodiment, the client application 221 is a sales tool for helping sales representatives (i.e., users) of pharmaceutical companies (i.e., customers) to promote products to physicians (i.e., targets). Each of the pharmaceutical companies may store work-related information about physicians it collected in the database system 210, which may be a multi-tenant, cloud based CRM database system. Each pharmaceutical company may manage data availability to its sales representatives by territories, which could be a geographic area or a product. Each sales representative may access data in the database system 210 of one of the pharmaceutical companies, specifically data for physicians in the territory he/she is assigned. A pharmaceutical company may store information of tens of thousands of physicians and hundreds of products in the database system 210, but a sales representative may be allowed to access information of only a subset of the physicians (e.g., hundreds) and/or a subset of the products (e.g., tens) which are in the territory he/she is assigned.

To enable a sales representative to use the client application 221 even when the user computing devices 220a-220n are disconnected and provide seamless transition between online and offline use, data relevant to a sales representative's use of the client application 221 may be stored in the client database 222. Such information may include, e.g., data related to the subset of physicians and/or products in his/her territory. The sales representative may also be allowed to access the CLM content in the CLM module 232 for the subset of products in his/her territory. The sales representative may further be allowed to access analytics data about the subset of physicians and/or products in his/her territory. The CLM content for the subset of products and analytics data about the subset of physicians and/or products may be stored in the client database 222 as well. The client application 221 may be used by the sales representative to, e.g., search for a physician, schedule a meeting with the physician, search for and display CLM content during the meeting with the physician, record the call, and update physician and/or product information.

In order to provide a sales representative correct and newest information, and to share new information from a sales representative with other sales representatives in the same pharmaceutical company, client databases 222 on user computing devices 220a-220n and the database system 210 need to be synchronized from time to time, which may be carried out by the client side sync module 223 and the server side sync module 2317. The client database 222 and the database system 210 may be synchronized regularly according to a preset schedule, in response to a user request, and/or when the user computing device 220a-220n is back online.

Figure 6A:
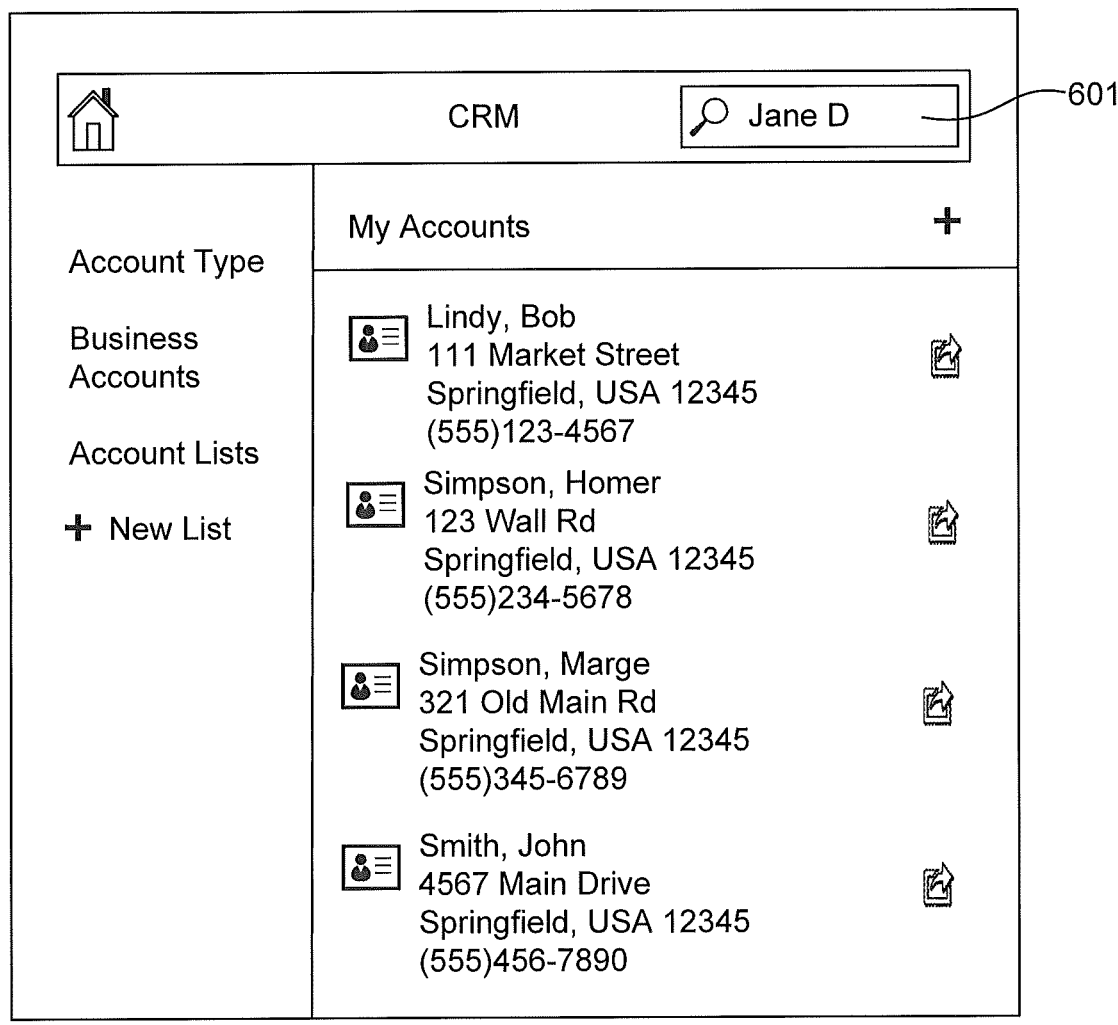
Figure 6B:
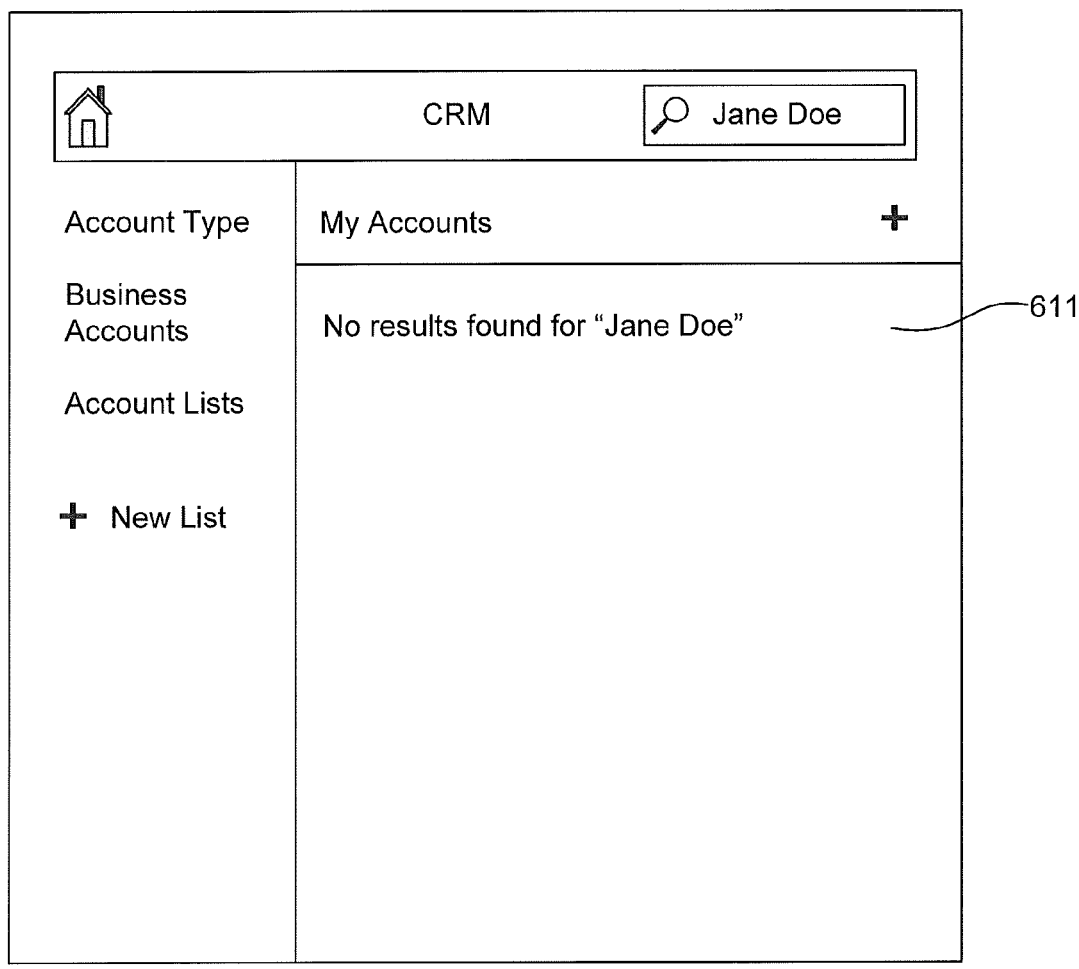
Figure 6D:
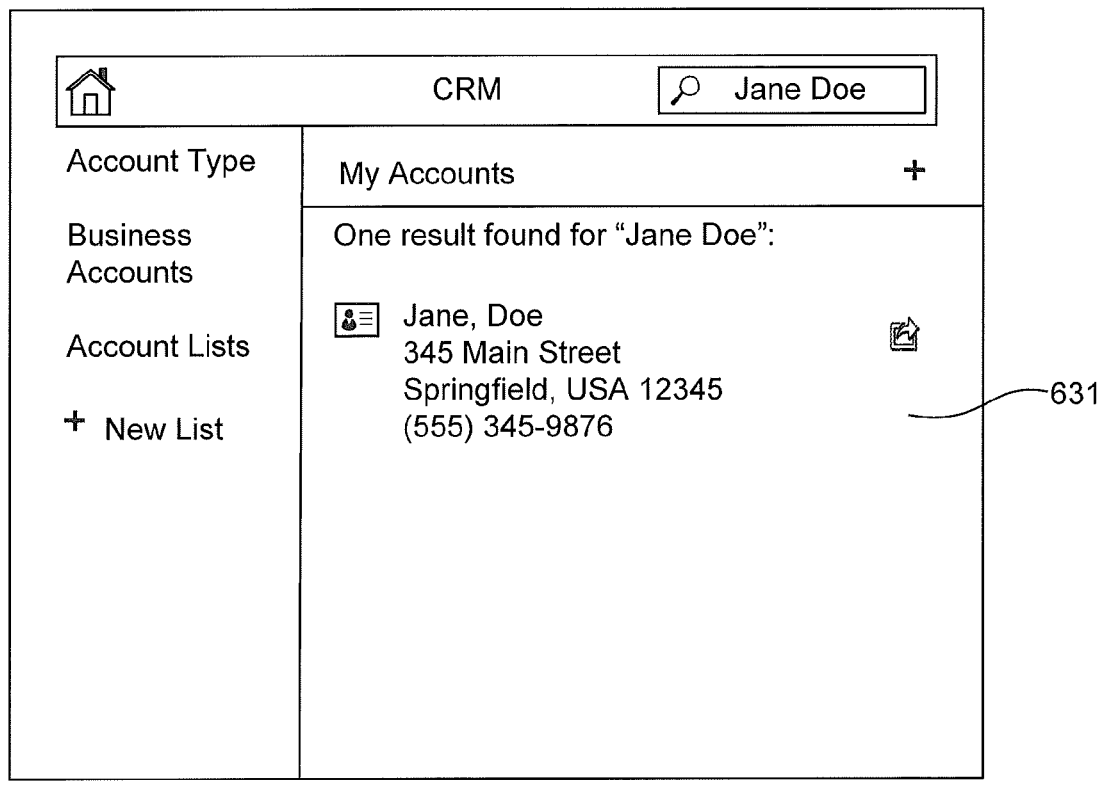

FIGS. 6A, 6B, 6C and 6D illustrate screenshots during an exemplary synchronization of the client database 222 and the database system 210. Before or during a meeting with a physician, a sales representative may search for the physician's information, e.g., with user computing device 220a. As shown in FIG. 6A, the sales representative may log into the client application 221, and input the physician's name (e.g., Jane Doe) in a search window 601 on a search page 600A. The client application 221 may search the sales representative's set of data in the client database 222 and/or the database system 210 for this physician, and display a search result page 600B, as shown in FIG. 6B. Since no information about the physician is returned in the search result window 611, the sales representative may go to a page 600C for adding an account, and input the new physician information in windows 621-626 on that page, as shown in FIG. 6C. After the sales representative finishes inputting the new physician information and submits, the client database 222 may be updated with the new physician information. During the next synchronization between the client database 222 and the database system 210, the new physician information may be uploaded to the database system 210 and reconciled with records there, and the reconciled data may be stored in the database system 210. Then the reconciled data may be downloaded to client databases 222 for all sales representatives whose territories include the new physician. After that, when another sales representative searches for the physician, her information will be displayed in a search result window 631 on a returned search result page 600D, as shown in FIG. 6D.

Incremental synchronization may be used in the data synchronization between the database system 210 and the client database 222. During an incremental synchronization, the set of data in the client database 222 may be matched with the corresponding set of data in the database system 210 to find out the changes in the database system 210 since the last synchronization indicated by, e.g., timestamps, and then only the changes may be downloaded to the client database 222. Since only the changes, instead of the whole set of data, are downloaded to the client database 222, the amount of traffic on the network 250 can be significantly reduced and efficiency can be significantly improved when dealing with large data sets.

The synchronization between a sales representative's client database 222 and the database system 210 may be configured, e.g., on an object configuration page. The configuration may be done by an administrator at a customer (e.g., a pharmaceutical company) who decides what type of synchronization should be enabled for an object. The object configurations may allow customers to control visibility of data and its relationship across objects. For instance, clinical trial information that is related to an account may be synced whereas related orders may be skipped. The incremental synchronization may be implemented by various types of synchronizations, e.g., full object synchronization, top level object synchronization, related-to-top level object synchronization, and child and parent object synchronization.

The full object synchronization may be used to synchronize all of the data contained within an object, and may be reserved for reference objects, such as the product catalog and other lookup objects. FIG. 7A illustrates some examples of objects which may use the full object synchronization.

The top level object synchronization may be used to synchronize all of the data contained within objects, and may be reserved for master objects, such as account, event, call and user. FIG. 7B illustrates some examples of objects which may use the top level object synchronization.

Objects with related-to-top level synchronization specified will be queried as sub-queries of the specified parent top-level object, and records for these objects will only be returned if they are associated with a parent record that is returned. Such objects may include, e.g., expense and task, as shown in FIG. 7C.

The child and parent object synchronization may be used when a child object controls visibility of the parent.

Some database systems may enable customers to create and use sharing rules to control data visibility among users. With sharing rules, a customer can make automatic exceptions to its organization-wide sharing settings for defined sets of users, so that such users can only see what they are allowed to see. In the example shown in FIG. 8A, a customer may group its users according to the products they work on. Specifically, group 1 may include users 1 and 4, who work on a cancer drug C and whose targets are oncologists; and group 2 include users 2 and 3, who work on a cholesterol drug L and whose targets are cardiologists. To satisfy regulatory requirements, the customer needs to make sure that users in group 1 will not talk about cholesterol drugs, and users in group 2 will not talk about cancer drugs. So the customer may set the sharing rule as: sharing Key Message records related to the cancer drug C in group 1 only, and sharing Key Message records related to the cholesterol drug L in group 2 only.

Sometimes, sharing rules may change, and objects visible to the users should change accordingly. For example, as shown in FIG. 8B, when user 4 is moved from group 1 to group 2 after the last synchronization, the data visible to him/her should be changed from data related to the cancer drug C to data related to the cholesterol drug L. However, since there is not any change in either object records themselves or timestamps after a sharing rule change, it is difficult for an incremental sync to pick this up and update data visibility accordingly.

To solve this problem, an enhanced synchronization may be performed to support the new sharing rule on user computing devices and make object visibility comply with the new sharing rule. An administrator at a customer may anticipate scenarios in which an enhanced synchronization may need to be performed to support a sharing rule change in a synchronization process, e.g., the group change scenario described above with reference to FIGS. 8A and 8B, and enable an enhanced synchronization in advance for such scenarios. In one implementation, the administrator may log into an administrator client on a user computing device, e.g., 220*b*, and enable enhanced synchronization by configuring the objects. In one implementation, the administrator may enable enhanced synchronization by checking an enhanced synchronization checkbox on an object configuration record. The enhanced synchronization may be carried out through collaboration between the server side sync module 2317 (as shown in FIG. 5) in the sync server 231 and the client side sync module 223 (as shown in FIG. 4) in the user computing device 220*a*.

Figure 9A:
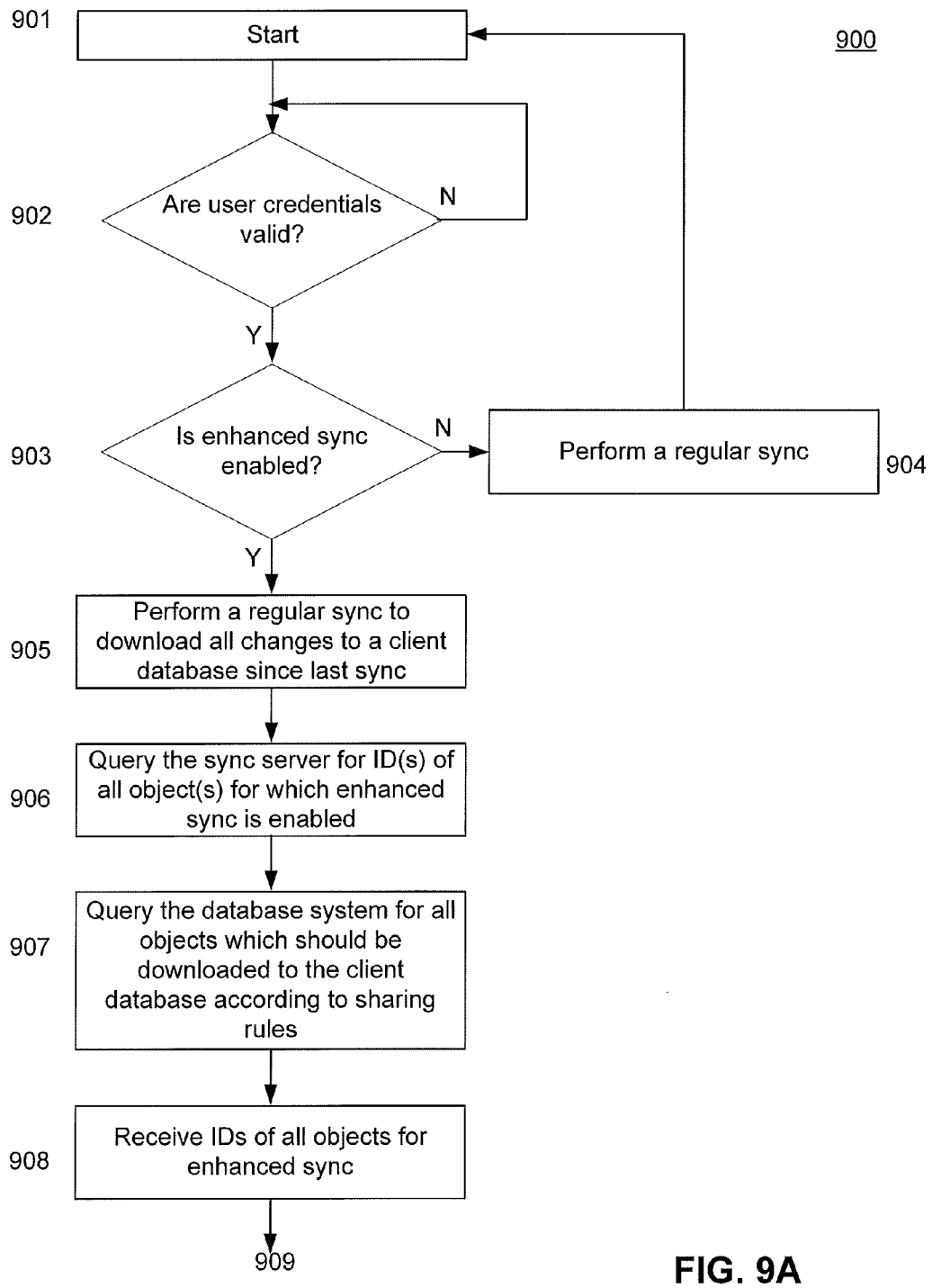
FIGS. 9A and 9B illustrate an exemplary flowchart of the method for synchronizing data between a database system and its client applications according to one embodiment of the present invention.
Figure 9B:
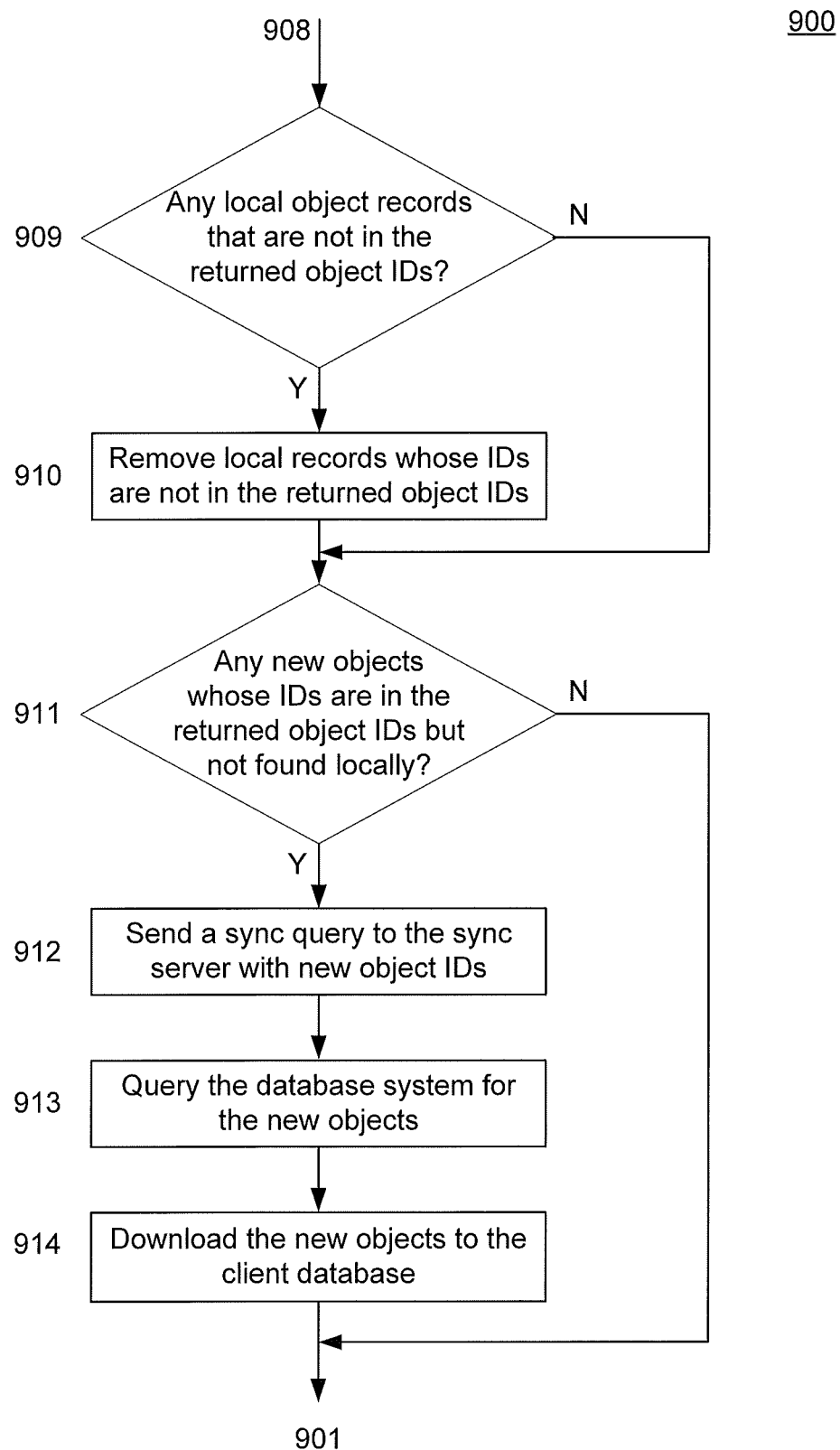

FIGS. 9A and 9B illustrate an exemplary flowchart of the method for synchronizing data between a database system and its client applications according to one embodiment of the present invention. The method may be implemented in the environments shown in FIG. 2A, 2B or 2C, may use the computing devices shown in FIGS. 3-5, and may be used in the sharing rule change scenario shown in FIGS. 8A and 8B.

The synchronization may start at 901, as shown by a synchronization start indicator.

At 902, it may be determined by the server side sync module 2317 if a user (e.g., user 4) is logged into a client application (e.g., 221) and if the user credentials are valid. If not, the process may return to 901.

If user credentials are valid, at 903, it may be determined if enhanced synchronization is enabled, e.g., the server side sync module 2317 may determine if the enhanced synchronization checkbox on the object configuration record of any objects is checked. If not, the process may proceed to 904 and a regular synchronization, e.g., incremental synchronization, may be performed by the server side sync module 2317 and the client side sync module 223. The process may then return to 901.

If enhanced synchronization is enabled for one or more objects, the preset synchronization schedule may be ignored, and the synchronization may be initiated right away, starting from a regular synchronization (e.g., an incremental synchronization) at 905 to update data in the client database 222. In one implementation, all changes to the data in the client database 222 since the last synchronization may be downloaded to the client database 222. The regular synchronization may be one type of synchronizations described above with reference to FIGS. 7A, 7B and 7C: full object synchronization, top level object synchronization, related-to-top level object synchronization, or child and parent object synchronization. In one implementation, when the regular synchronization is finished, the client database 222 may store, among other data or records, Key Message records related to the cancer drug C, but not those related to the cholesterol drug L, as required by the sharing rule shown in FIG. 8A.

In one implementation, local changes to the client database 222 after the last synchronization may be uploaded to the database system 210 first, and reconciled with data in the database system 210. Then changes in the database system 210 since the last synchronization may be downloaded to the client database 222.

In one implementation, the client application 221 may create a new temporary table to hold the data when it is being downloaded from the database system 210. Once all data has been downloaded, the data may be moved from the temporary table to a target table, so that use of the client application 221 is not interrupted.

When all changes since the last synchronization are downloaded to the client database 222 and the regular synchronization is finished, the client side sync module 223 may query the sync server 231, at 906, for ID(s) of all object(s) for which enhanced synchronization is enabled.

At 907, after receiving the query from the client side sync module 223, the server side sync module 2317 may perform the same query to the database system 210 it would use if doing a full object synchronization. In other words, the server side sync module 2317 may query the database system 210 for all objects which should be downloaded to the client database 222 according to the currently valid sharing rules. For user 4, such objects should include, among other data or records, all Key Message records related to the cholesterol drug L, as shown in FIG. 8B.

At 908, the server side sync module 2317 may return ID(s) for all object(s) for enhanced synchronization to the client side sync module 223.

At 909, after receiving the ID(s) for all object(s) for enhanced synchronization returned from the server side sync module 2317, the client side sync module 223 may check the client database 222 associated with user 4, and determine if there are any obsolete local objects whose ID(s) are not in the returned object ID(s), e.g., object records related to the cancer drug C which is not required by the sharing rules anymore.

If yes, at 910, the client side sync module 223 may remove from the client database 222 the obsolete local object records whose ID(s) are not in the returned object ID(s), e.g., object records related to the cancer drug C. Otherwise, the process may proceed to 911.

At 911, the client side sync module 223 may determine if there are any new objects whose ID(s) are in the returned object ID(s) but are not found locally. For the example shown in FIG. 8B, the new objects may include, among other data or records, Key Message records related to the cholesterol drug L. If not, the process may return to 901.

If there are new objects whose ID(s) are in the returned object ID(s) but are not found locally, the client side sync module 223 may send a sync query to the server side sync module 223 with the new object ID(s) at 912.

At 913, the server side sync module 2317 may query the database system 210 for these specific new object ID(s) to obtain the new object(s). In one implementation, the server side sync module 2317 may query only for the objects itself, not related objects.

At 914, the client side sync module 223 may download new object(s) to the client database 222.

Then one synchronization is finished, as shown by a synchronization end indicator, and the process may return to 901. Consequently, user 4 is able to see, among other data or records, Key Message records related to the cholesterol drug L, but not those related to the cancer drug C, as required by the sharing rule shown in FIG. 8B.

In the embodiment shown in FIGS. 9A and 9B, the synchronization starts ahead of a scheduled regular synchronization. Alternatively, the synchronization may start at next scheduled regular synchronization, and 906-914 may be performed after the regular synchronization.

In the environment in FIG. 2B, CLM content in the client database 222 may be updated for user 4 to be consistent with visible objects required by the new sharing rule, so that he/she can see CLM content related to the cholesterol drug L, but not that related to the cancer drug C.

In the environment in FIG. 2C, analytics data in the client database 222 may be updated for user 4 to be consistent with visible objects required by the new sharing rule, so that he/she can see analytics data related to the cholesterol drug L, but not that related to the cancer drug C.

Since only data that user 4 is allowed to access is stored in the client database 222, and data that user 4 is no longer allowed to access is deleted, less data is stored on the user computing device 220a. User computing devices, especially mobile computing devices, may have limitations on memory capacity, data storage capacity, central processing unit (CPU) capacity, and networkability, and may become very slow if too much data is provided to them from the database system 210. By removing data that the user is no longer allowed to access according to the new sharing rule from the client database 222, the method 900 may significantly improve performance of the user computing device 220a and the client application 221. In one example, the client application 221 may be speeded up for over 5%.

Thus, enhanced synchronization includes checking the new sharing rule after a regular synchronization, removing data in the client database 222 that the user is no longer allowed to access under the new sharing rule, and downloading data that the user is given access under the new sharing rule but was not in the client database 222. Thus, after enhanced synchronization, data in the client database 222 complies with the new sharing rule and does not include obsolete data.

In addition to the sharing rule reconfiguration scenario shown in FIGS. 8A and 8B, enhanced synchronization may be used in other situations, e.g., when the WHERE clause on an object's Object Configuration record is changed, or an object is changed from a private sharing model to a public sharing model.

While exemplary embodiments have been described in connection with various computing devices and network architectures, the underlying concepts may be applied to any network system and any computing device or system in which it is desirable to synchronize.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for synchronizing data between a database system and a client database for a client application on a user computing device, the method comprising:
    determining if enhanced synchronization is enabled for a first object, wherein the first object was downloaded to the client database according to a first protocol for controlling access to the database system;
    when enhanced synchronization is enabled for the first object, performing a regular synchronization for updating the first object in the client database according to the first protocol for controlling access to the database system;
    determining that the first protocol for controlling access to the database system is replaced with a second protocol for controlling access to the database system; and
    performing the enhanced synchronization according to the second protocol for controlling access to the database system, wherein the enhanced synchronization comprises:
        determining ID of the first object;
        querying the database system for ID of at least one object which should be downloaded to the client database according to the second protocol for controlling access to the database;
        determining if the ID of the at least one object includes a new ID which is different from the ID of the first object; and
        when the ID of the at least one object includes the new ID, querying the database system for an object with the new ID, and downloading the object with the new ID to the client database,
    wherein the database system is a customer relationship management ("CRM") system and the first object is a data object in the CRM system.

2. The method of claim 1, further comprising:
    determining if the ID of the first object matches any ID of the at least one object; and
    when the ID of the first object does not match any ID of the at least one object, deleting the first object from the client database.

3. The method of claim 1, wherein the regular synchronization is an incremental synchronization, and changes since the last synchronization are downloaded to the client database.

4. The method of claim 1, wherein the regular synchronization is selected from full object synchronization, top level object synchronization, related to top level object synchronization and child and parent object synchronization.

5. The method of claim 1, wherein the first protocol for controlling access to the database system is based on a first sharing rule, and the second protocol for controlling access to the database system is based on a second sharing rule.

6. The method of claim 1, wherein the first protocol for controlling access to the database system is based on a private sharing model, and the second protocol for controlling access to the database system is based on a public sharing model.

7. The method of claim 1, further comprising: storing closed loop marketing ("CLM") content in the client database according to the first protocol for controlling access to the database system.

8. The method of claim 7, further comprising: updating the CLM content in the client database according to the second protocol for controlling access to the database system when the enhanced synchronization is enabled.

9. The method of claim 1, further comprising: storing analytics data in the client database according to the first protocol for controlling access to the database system.

10. The method of claim 9, further comprising: updating analytics data according to the second protocol for controlling access to the database system when the enhanced synchronization is enabled.

11. The method of claim 1, wherein the enhanced synchronization is a full object synchronization.

12. The method of claim 1, wherein the regular synchronization starts before a preset schedule for the regular synchronization.

13. The method of claim 1, wherein the client application is a sales tool.

14. The method of claim 1, wherein the client application is a sales tool for marketing medical products.

15. The method of claim 1, further comprising: receiving an instruction for enabling the enhanced synchronization for the first object.

16. The method of claim 15, wherein the instruction is received at an enhanced synchronization checkbox on the first object's configuration record.

17. A computer-implemented method for synchronizing data between a database system and a client database for a client application on a user computing device, the method comprising:
    performing a regular synchronization for updating a first object and a second object in the client database according to a first protocol for controlling access to the database system, wherein the first object and the second object were downloaded to the client database according to the first protocol for controlling access to the database system; and
    when enhanced synchronization is enabled for the first object, determining that the first protocol for controlling access to the database system is replaced with a second protocol for controlling access to the database system, and performing the enhanced synchronization according to the second protocol for controlling access to the database system, wherein the enhanced synchronization comprises:
        determining ID of the first object;
        querying the database system for ID of at least one object which should be downloaded to the client database according to the second protocol for controlling access to the database;
        determining if the ID of the first object matches any ID of the at least one object;
        when the ID of the first object does not match any ID of the at least one object, deleting the first object from the client database;
        determining if the ID of the at least one object includes a new ID which is different from the Ms of the first object and the second object; and
        when the ID of the at least one object includes the new ID, querying the database system for an object with the new ID, and downloading the object with the new ID to the client database, wherein the database system is a customer relationship management ("CRM") system and the first object is a data object in the CRM system.

18. A system for synchronizing data between a database system and a client database for a client application on a user computing device, the system comprising:
    a sync module in a processor in the database system which
        receives an instruction for enabling enhanced synchronization for a first object, wherein the first object was downloaded to the client database in a memory in the user computing device according to a first protocol for controlling access to the database system;
        determines if enhanced synchronization is enabled for the first object;
        when the enhanced synchronization is enabled for the first object, performs a regular synchronization for updating the first object in the client database according to the first protocol for controlling access to the database system;
        determines that the first protocol for controlling access to the database system is replaced with a second protocol for controlling access to the database system; and
        performs the enhanced synchronization according to the second protocol for controlling access to the database system, wherein the enhanced synchronization comprises:
            receiving a query for ID of at least one object which should be downloaded to the client database according to the second protocol for controlling access to the database;
            querying the database system for the ID of at least one object; and
            when the ID of the at least one object includes a new ID which is different from the ID of the first object, querying the database system for an object with the new ID, and transmitting the object with the new ID to the client database,
    wherein the database system is a customer relationship management ("CRM") system and the first object is a data object in the CRM system.

* * * * *